US009846749B2

(12) United States Patent
Cai et al.

(10) Patent No.: US 9,846,749 B2
(45) Date of Patent: *Dec. 19, 2017

(54) MAINTAINING CONTINUOUS ACCESS TO WEB CONTENT

(71) Applicant: International Business Machines Corporation, Armonk, NY (US)

(72) Inventors: Anping Cai, Concord, CA (US); Diane C. Chalmers, Rochester, MN (US); Ugo I. Orellana Gonzalez, San Jose (CR); Sharath Srinivasa Setty, Cupertino, CA (US); Renganathan Sundararaman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,628

(22) Filed: Jul. 26, 2016

(65) Prior Publication Data
US 2017/0083629 A1 Mar. 23, 2017

Related U.S. Application Data

(63) Continuation of application No. 14/972,165, filed on Dec. 17, 2015, now Pat. No. 9,454,285, which is a
(Continued)

(51) Int. Cl.
*G06F 17/30* (2006.01)
*G06F 7/00* (2006.01)
(Continued)

(52) U.S. Cl.
CPC .... *G06F 17/30884* (2013.01); *G06F 3/04817* (2013.01); *G06F 3/04842* (2013.01);
(Continued)

(58) Field of Classification Search
CPC ......... G06F 17/30884; G06F 17/30864; G06F 17/30887; G06F 3/04864; G06F 3/04842; H04L 67/00; H04L 67/02; H04L 67/142
See application file for complete search history.

(56) References Cited

U.S. PATENT DOCUMENTS

| 5,813,007 A | 9/1998 | Nielsen |
| 5,978,828 A | 11/1999 | Greer et al. |

(Continued)

FOREIGN PATENT DOCUMENTS

AU  2003200819 B2  8/2005

OTHER PUBLICATIONS

Kolilakath et al., Semantic broken link detection using structured tagging scheme, Aug. 2012, 5 pages.*
(Continued)

*Primary Examiner* — Thuy Dao
(74) *Attorney, Agent, or Firm* — Gilbert Harmon, Jr.

(57) ABSTRACT

An approach for providing a framework to maintain continuous access to web content bookmarked in a browser, the framework comprising web content storage, change detection and change notification. Embodiments of the present invention create and store a snapshot of bookmarked web content with a version number in a repository and the snapshot is replaced by a new snapshot whenever bookmarked web content is updated, while access to previously versioned snapshots is maintained. Change detection comprises automatically subscribing to content update notification services provided by a web content provider and receiving updates, comparing the content of a most recent snapshot with the web content available from the content provider and detecting a change to the bookmarked URL. Keywords from a snapshot can be used to relocate web
(Continued)

content at a new URL and a web browser user is notified whenever a change to bookmarked web content is detected.

1 Claim, 5 Drawing Sheets

Related U.S. Application Data continuation of application No. 14/861,061, filed on Sep. 22, 2015.

(51) Int. Cl.
*G06F 3/0481* (2013.01)
*G06F 3/0484* (2013.01)
*H04L 29/08* (2006.01)

(52) U.S. Cl.
CPC .. *G06F 17/30864* (2013.01); *G06F 17/30887* (2013.01); *G06F 17/30902* (2013.01); *H04L 67/00* (2013.01); *H04L 67/02* (2013.01); *H04L 67/142* (2013.01)

(56) References Cited

U.S. PATENT DOCUMENTS

| | | | |
|---|---|---|---|
| 8,001,215 B2 | 8/2011 | Dominowska et al. | |
| 8,386,427 B2 | 2/2013 | Collet et al. | |
| 8,504,692 B1 | 8/2013 | Henderson | |
| 8,533,199 B2 | 9/2013 | Malla | |
| 8,881,018 B2 * | 11/2014 | Kondasani | G06F 17/30887 714/25 |
| 8,943,197 B1 | 1/2015 | Taylor et al. | |
| 8,996,977 B2 * | 3/2015 | Szalai | G06F 17/3089 715/205 |
| 9,075,885 B2 * | 7/2015 | Walker | G06F 17/30887 |
| 9,454,285 B1 | 9/2016 | Cai et al. | |
| 9,509,691 B2 * | 11/2016 | Pieczul | H04L 63/0876 |
| 9,558,060 B1 * | 1/2017 | Cessac | G06F 11/0793 |
| 2002/0116525 A1 | 8/2002 | Peters et al. | |
| 2003/0144984 A1 | 7/2003 | Dunbar | |
| 2008/0195674 A1 | 8/2008 | Kim et al. | |
| 2014/0108901 A1 | 4/2014 | Carriero et al. | |
| 2015/0025981 A1 * | 1/2015 | Zaretsky | G06F 17/30887 705/14.73 |
| 2016/0246881 A1 * | 8/2016 | King | G06F 17/30864 |

OTHER PUBLICATIONS

Martinez-Romo et al., Retrieving broken web links using an approach based on contextual information, Jun. 2009, 2 pages.*
Cai et al., Maintaining Continuous Access to Web Content, U.S. Appl. No. 14/861,061, filed Sep. 22, 2015, 30 pages.
IBM Appendix P, list of patents or patent applications treated as related, filed Mar. 2, 2017, 2 pages.

* cited by examiner

MAINTAINING CONTINUOUS ACCESS TO WEB CONTENT

BACKGROUND OF THE INVENTION

The present invention relates generally to the field of bookmarked web content, and more particularly to maintaining continuous access to bookmarked web content.

The bookmarking of web content is a useful feature employed by most internet web browsers enabling a user to quickly navigate to the web content as needed, saving the user time because they do not have to perform a new search or manually enter a web address every time they need to access the web site they have in mind. Bookmarked content can also be stored in cache memory so that it is more quickly accessed in terms of computer processing time. However, web content, such as a web page, can be modified by a web content provider, moved to a different Uniform Resource Locator (URL) or a different web server, or removed. Accordingly, web browser based applications, known as "plugins," can be employed to allow a web browser user to maintain continuous access to bookmarked web content in the event normal access has been disrupted.

SUMMARY

According to one embodiment of the present invention, a computer program product for maintaining bookmarked web content is provided, the computer program product comprising one or more computer readable storage media and program instructions stored on the one or more computer readable storage media, the program instructions comprising program instructions to provide a framework for maintaining continuous access to web content via bookmarks, wherein the framework is installed as a plugin to a web browser and comprises web content storage, change notification and change detection, wherein the change notification comprises at least one of a pop-up notification window, a push notification and an alert icon in a list of bookmarks and the web content storage is a content storing subsystem to store one or more snapshots of the web content in a repository, the repository comprising at least one of local and remote storage; program instructions to store a first snapshot of the web content, associated with a Uniform Resource Locator (URL), in the repository responsive to detecting a bookmark for the URL, wherein the first snapshot is given a version number and is shared across one or more computing devices with one or more authorized users; program instructions to automatically adjust the bookmark to reflect a change to the URL, responsive to determining the change to the URL; program instructions to apply a cache update policy to store a second snapshot of the web content in the repository while maintaining access to previously stored snapshots, responsive to determining a change to the web content associated with the URL, wherein the cache update policy is based on at least one of receiving a content update notification, a comparison of a most recently stored snapshot with the web content and a comparison of metadata associated with the most recently stored snapshot against metadata associated with the web content; program instructions to relocate the web content or provide one or more content recommendations using a public search engine based on search criteria within the most recently stored snapshot responsive to determining a loss of reference to the web content, the search criteria comprising at least one of keywords and a portion of text associated with the most recently stored snapshot, and automatically adjust the bookmark to reflect the change; and program instructions to provide a user interface (UI) allowing a user to control one or more settings for the framework, wherein the one or more settings comprise at least one of storage of the one or more snapshots of the web content, broken link handling, the cache update policy and update notifications.

DETAILED DESCRIPTION

Embodiments of the present invention recognize the need for an integrated solution to maintain continuous access to bookmarked web content that requires minimal user intervention. Web content is bookmarked because the information it provides is valuable and useful to a web user, yet there are a number of circumstances where continuous access to this information can be interrupted. These circumstances can include when a web content provider or author decides to update the content of a bookmarked web page, when a bookmarked web page is relocated to a different URL, when the web content is removed by the content provider or when the provider is experiencing an outage on their host server. These and other similar types of circumstances can cause a web user to temporarily or permanently lose access to content and information they need and can, in some cases, cause disruptions in work productivity and efficacy. It is with this in mind that embodiments of the present invention propose a solution designed to automatically handle these interruptions to normal, continuous access to bookmarked web content with little user intervention. Further, embodiments also provide the feature of being able to save, on local or remote storage, snapshots of multiple versions of web content that has been edited numerous times, which can be highly desirable to web users who need to reference past versions of web content.

Figure 1A:
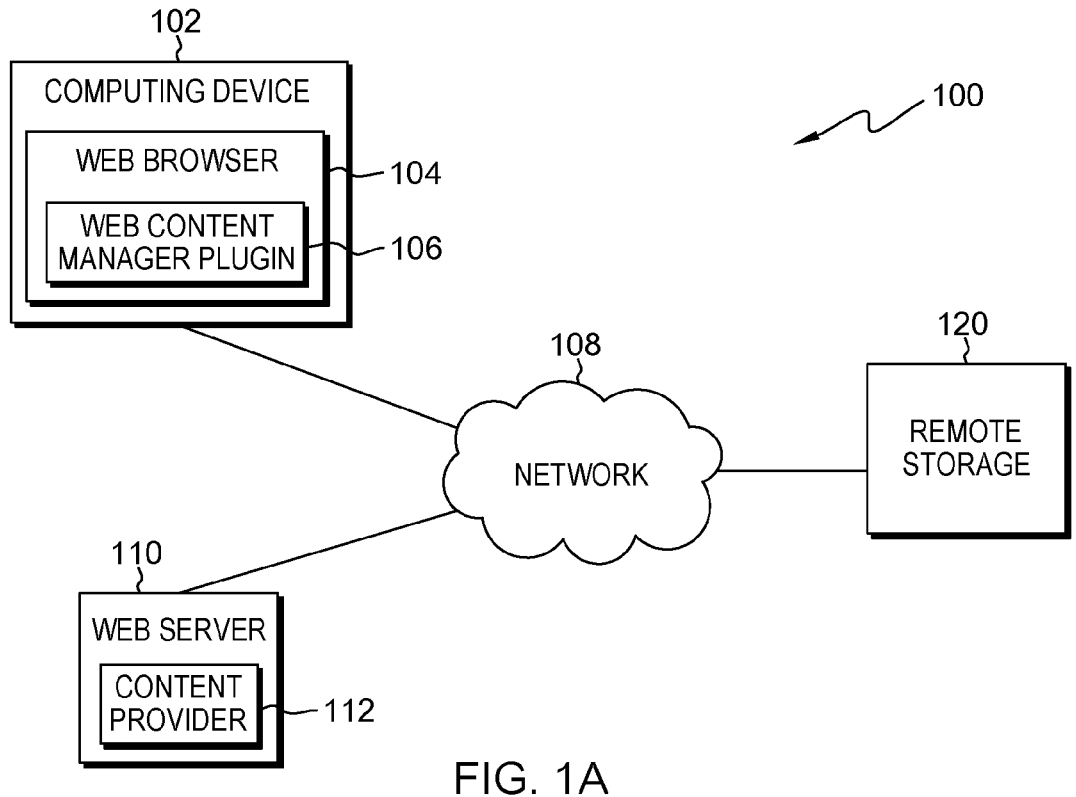
FIG. 1A-B is a functional block diagram illustrating a distributed data processing environment and a functional block diagram depicting components of a web content manager plugin, respectively, in accordance with an embodiment of the present invention.

The present invention will now be described in detail with reference to the figures. FIG. 1A is a functional block diagram illustrating a distributed data processing environment 100 in accordance with an embodiment of the present invention. Distributed data processing environment 100 comprises computing device 102, web server 110 and remote storage 120, interconnected over network 108.

Computing device 102 can be a laptop computer, tablet computer, netbook computer, personal computer (PC), a desktop computer, a personal digital assistant (PDA), a smart phone, or any programmable electronic device capable of communicating with web server 110 and remote storage 120 via network 108. Computing device 102 has web browser 104 installed which comprises web content manager plugin 106, a framework designed to help a user maintain continuous access to bookmarked web content. Computing device 102 can include internal and external hardware components, as depicted and described in further detail with respect to FIG. 5.

Web server 110 can be any type of computer having the necessary hardware and software to support a web site and comprises content provider 112. Content provider 112 creates, manages and updates web content, such as, but not limited to, web sites and/or web pages (and associated content such as, but not limited to, text, images, audio files, video files, etc. . . . ), to be accessed on the internet via web browser 104. Remote storage 120 can be one or more computer servers, such as, but not limited to, a Cloud service, which store files and data externally to computing device 102.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computing device 102, web server 110 and remote storage 120.

Figure 1B:
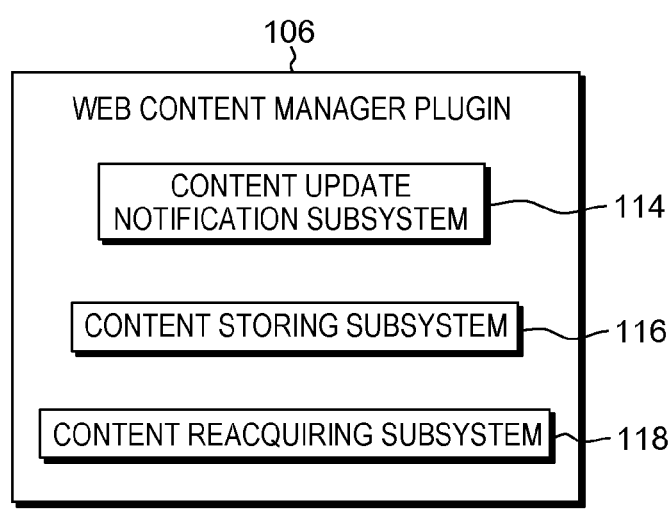

FIG. 1B is a block diagram of web content manager plugin 106 comprising content update notification subsystem 114, content storing subsystem 116 and content reacquiring subsystem 118. Content update notification subsystem 114 can detect if content provider 112 supports or offers a web content update notification service and send any information required such as, but not limited to, an internet protocol (IP) address, to subscribe to that service. In the event a notification of updated web content is received from content provider 112, content update notification subsystem 114 can alert the browser user by various means (e.g., a pop-up notification window, a "push notification" on a mobile computing platform, an alert icon placed next to the bookmark in the browser, etc. . . . ). It should be understood that this process of alerting the browser user can be referred to as "change notification" and can occur whenever a change to bookmarked web content is detected by web content manager plugin 106.

Content storing subsystem 116 can create and store one or more snapshots of web content, such as, but not limited to, at least a portion of the content of a web page, in a repository on local (i.e., on computing device 102) and/or remote storage when the web content is bookmarked by a user or when previously saved bookmarks are detected by web content manager plugin 106. New snapshots can be created and saved manually, on a predetermined schedule (either default or user configured) or when detected changes have been made to the web content by content provider 112 and the new snapshots will be given a number indicating a version for the repository. It should also be noted that the capability of embodiments to detect changes to bookmarked web content in any manner discussed herein can be referred to as a "change detection" feature of the framework.

According to one embodiment of the present invention, a snapshot of web content available from content provider 112 can be stored on local or remote cache memory for rapid access to content that is available even if web server 110 is experiencing an outage. When the web content is updated, the snapshot in cache memory can be replaced by a new snapshot of the web content and the snapshot being replaced can be saved to a more permanent form of storage (i.e., persistent storage, which will be discussed in FIG. 5) to be referenced as needed by the user. Multiple snapshots of web content with version numbers can be saved for reference in the repository as the web content changes over time. It is to be furthermore understood that the repository comprises any storage media (i.e., local and/or remote) used to store the one or more snapshots of web content for a bookmark.

Content reacquiring subsystem 118 provides the capability to maintain continuous access to web content in the event of disruptions to normal access, such as, but not limited to, broken web links (when a URL no longer points to a valid web address) or URL redirects (when a user visiting a first URL is forwarded to a second URL). Broken links and URL redirects can be detected either when a user selects a bookmark or during a predetermined scheduled scan of bookmarked content. If a URL redirect is encountered when a bookmark is accessed, content reacquiring subsystem 118 can update the URL for the bookmark to the redirected URL. According to embodiments, if no URL redirect is encountered but the bookmarked web content has a broken URL, content reacquiring subsystem 118 can extract portions of, or keywords from, a most recently stored snapshot of the web content and use it to perform a web search via a public search engine (e.g., Google, Yahoo, Bing, etc. . . . ) to either relocate the web content at a new URL or provide consolidated search results to the user that recommend one or more URLs reflecting similar content.

Figure 2:
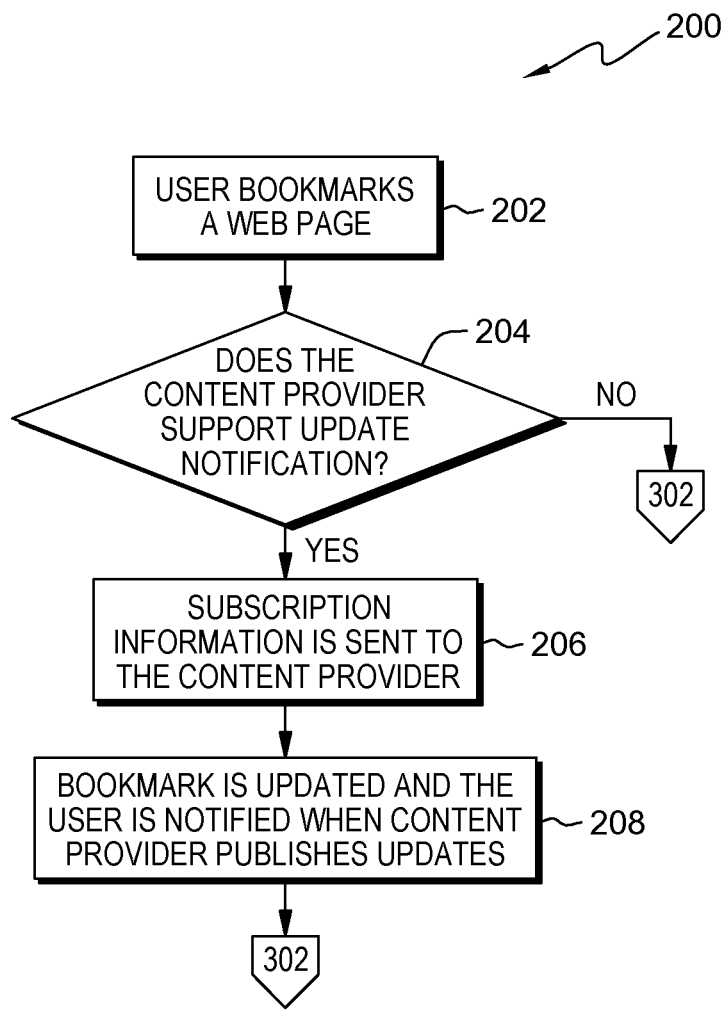
FIG. 2 is a flowchart depicting operational steps of a content update notification subsystem, in accordance with an embodiment of the present invention.

Turning to FIG. 2, a flowchart 200 is provided depicting initial operational steps of web content manager plugin 106 when a web page is bookmarked, in accordance with an embodiment of the present invention. A web browser user creates a new bookmark for a web page, at block 202, and content update notification subsystem 114 determines, at decision block 204, if the content provider 112 supports web content update notification. This can be accomplished, for example, by a scan of the metadata contained in an HTTP response header field to determine if content provider's 112 host server (i.e., web server 110) supports update notification functionality (i.e., an update service) and what information needs to be provided to subscribe for update notifications. If the content provider 112 does not provide update notification, web content manager plugin 106 moves to decision block 302 as will be discussed subsequently. If the content provider does support update notification, any information required to subscribe to the update service is sent, at block 206, to content provider 112. In the event that content provider 112 publishes an update of the bookmarked web content and the update service is subscribed to, web content manager plugin 106 will update, at block 208, the bookmark appropriately (such as updating the metadata for the bookmark) and provide a notification and/or indicator to the user to alert them of an update. A notification and/or indicator can include, for example, a pop-up window indicating that web content has been updated by content provider 112, an alert icon on the updated web content in the list of bookmarks and/or a push notification for a mobile computing platform. Once a bookmark has been updated in this manner and the user has been notified, embodiments proceed to decision block 302, dealing with storing a version of bookmarked web content.

Figure 3:
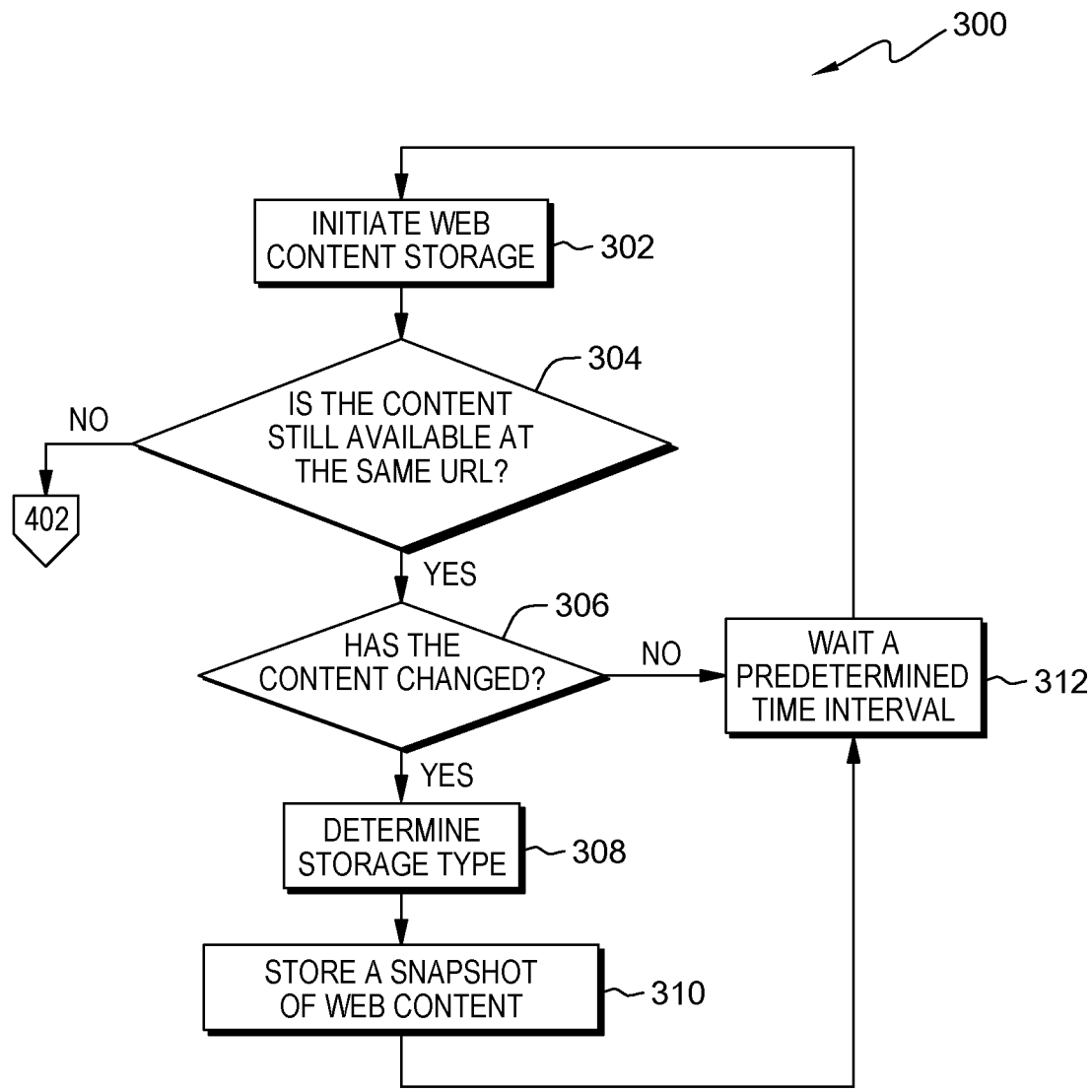
FIG. 3 is a flowchart depicting operational steps of a content storing subsystem, in accordance with an embodiment of the present invention.

Moving to FIG. 3, a flowchart 300 illustrates operational steps associated with content storing subsystem 116, according to an embodiment of the present invention. If a user decides to manually store a snapshot of bookmarked web content or if content storing subsystem 116 is preconfigured to automatically store web content, at decision block 302, content storing subsystem 116 determines, at decision block 304, if the web content is available at the original bookmarked URL. If the web content is not available at the original URL, embodiments move to decision block 402, as will be described subsequently. If the bookmarked web content is available at the original URL, content storing subsystem 116 determines, at decision block 306, if the web content has changed since the last time a snapshot of the web content was stored in local or remote memory (i.e., the most recently stored snapshot). This can be done by comparing the content (e.g., text, images, embedded files, etc. . . . ) of the most recently stored snapshot with the web content available from content provider 112 and determining, according to a predetermined and optionally configured user threshold, if the web content has changed enough from the most recently stored snapshot for a new snapshot to be stored in the repository. For example, if the comparison of content shows that the web content has changed by a predetermined threshold of 25% or more compared with the content of the stored snapshot in cache memory, then a new snapshot of the web content will replace the snapshot in cache memory, which will be stored in persistent storage.

In another manner of determining, at decision block 306, if the web content has changed from a most recently stored snapshot, the metadata of the most recently stored snapshot of web content can be compared with the metadata of the web content available from content provider 112 to scan for any changes to a date or time stamp, for example. If it is determined that the bookmarked web content has changed in any manner previously discussed, at decision block 306, content storing subsystem 116 will determine the storage type in which to store a new snapshot of the web content, at block 308. It should be understood that the term "cache update policy" can be used for this process of replacing the most recently stored snapshot by detecting that a change has occurred to the web content in any manner discussed herein.

The storage type can be a preconfigured choice set by a user of either local or remote storage. Remote storage can be the default option for web users on a mobile computing platform. Remote storage has the advantage of allowing multiple authorized users across a network to access the most recent and previously stored snapshots of stored web content from a plurality of computing devices. Some examples of remote storage and network protocols that can be accessed by multiple authorized users can include, but are not limited to, a cloud service, file transfer protocol (FTP) and Web-based Distributed Authoring and Versioning (Web-DAV).

Once the choice of storage has been selected, a snapshot of the bookmarked web content is stored, at block 310, and web content manager plugin 106, at block 312, can wait a predetermined time interval before prompting the user to store the web content or automatically storing the web content (starting at decision block 302) according to a user configured or default predetermined schedule. If bookmarked web content has not changed according to the predetermined threshold, at decision block 306, content storing subsystem 116 will wait the predetermined time interval before attempting to store the latest version of bookmarked web content. If the web content is no longer available at the originally bookmarked URL, web content manager plugin 106 proceeds to decision block 402.

It is to be understood that if, at decision block 302, a user wishes to store a snapshot of web content and none already exist in the repository (i.e., a user is storing the first snapshot for a bookmark), embodiments will proceed to decision block 304 to ensure that the web content is still available at the same URL, skip decision block 306 (since no snapshot exists with which to compare to the web content) and proceed to block 308 to determine the storage type.

Figure 4:
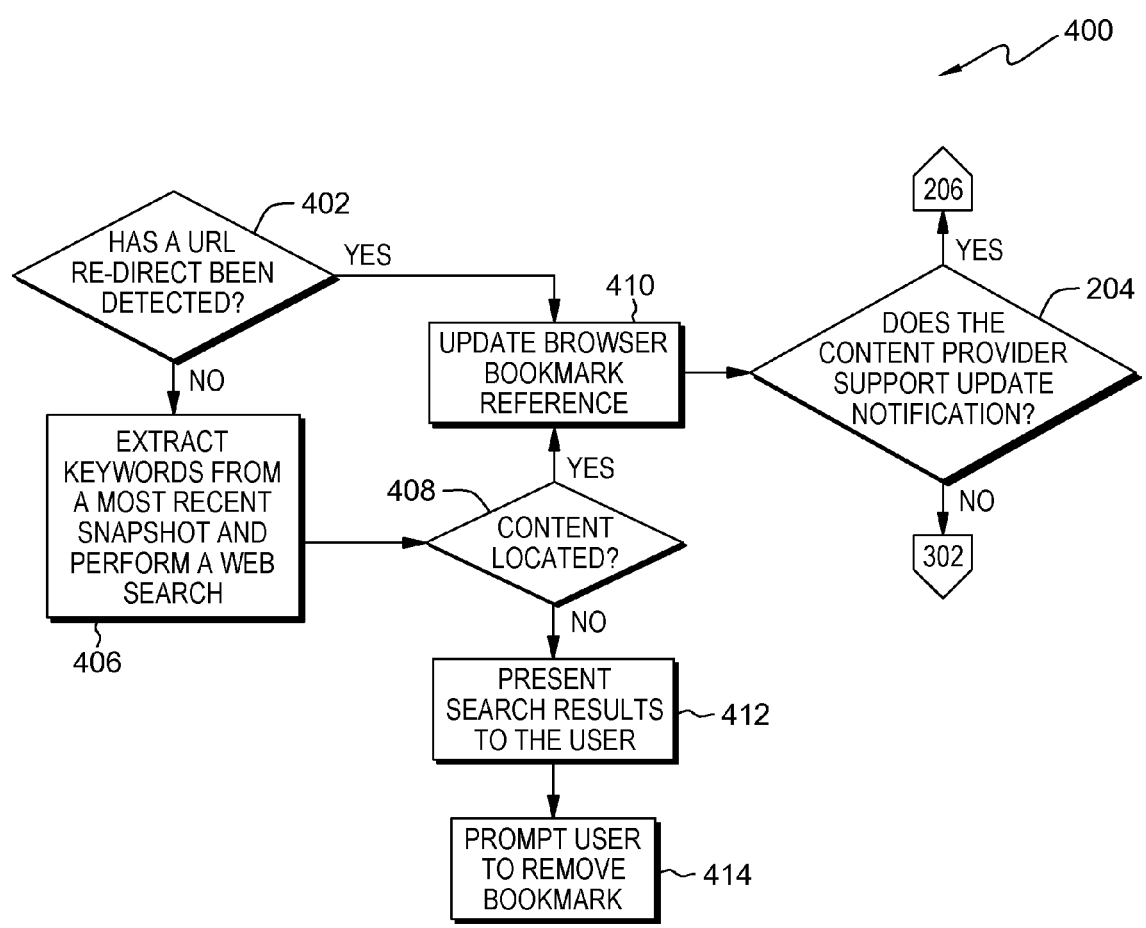
FIG. 4 is a flowchart depicting operational steps of a content reacquiring subsystem, in accordance with an embodiment of the present invention.

FIG. 4 depicts a flowchart 400 showing the operational steps of content reacquiring subsystem 118. If, at decision block 402, a redirect to a new URL is provided when a bookmark is accessed, content reacquiring subsystem 118 will automatically update the URL of the bookmark to reflect the change and content update notification subsystem 114 will check, at decision block 204, to determine if content provider 112 provides an update notification service if, for example, content provider 112 has moved to another web server 110. If an accessed bookmark no longer leads to a valid URL and no URL redirect is provided (i.e., a loss of reference to content), content reacquiring subsystem 118 will extract keywords or portions of text from the most recently stored snapshot and use them in a web search engine, at block 406, to locate the web content at a new URL. Content reacquiring subsystem 118 can determine, at decision block 408, if the web content has been located at a new URL if the content of a particular web search result either exactly or very nearly (e.g., within approximately 95% similarity) matches the keywords or portions of text from the stored snapshot used in the web search. If the web content is not located, at decision block 408, consolidated search results can be presented to the user, at block 412, to recommend similar content (e.g., other web pages providing similar content) and the user prompted as to whether or not they want the bookmark removed, at decision block 414, which can also delete any stored snapshots of the web content on local or remote storage, depending on where the versions of the web content are stored. If, at decision block 408, the web content is located at a new URL, content reacquiring subsystem 118 will update the URL and metadata of the bookmark accordingly, at block 410, and determine, at decision block 204, if content provider 112 supports update notifications. This process, wherein content reacquiring subsystem 118 handles a situation where a bookmark is accessed but the URL no longer points to a valid web address and no URL redirect is provided, can be herein referred to as "broken link handling."

It should be noted that at any point in time, though not explicitly shown in the figures, if a bookmark is accessed and a URL redirect is encountered, the URL for the bookmark will be automatically updated by embodiments of the present invention to reflect the change. It is also to be understood that web content manager plugin 106 provides a user interface (UI) which allows the web user to configure the settings for any of the processes discussed herein such as, but not limited to, storage of web content snapshots, broken link handling, the cache update policy and update notifications.

Figure 5:
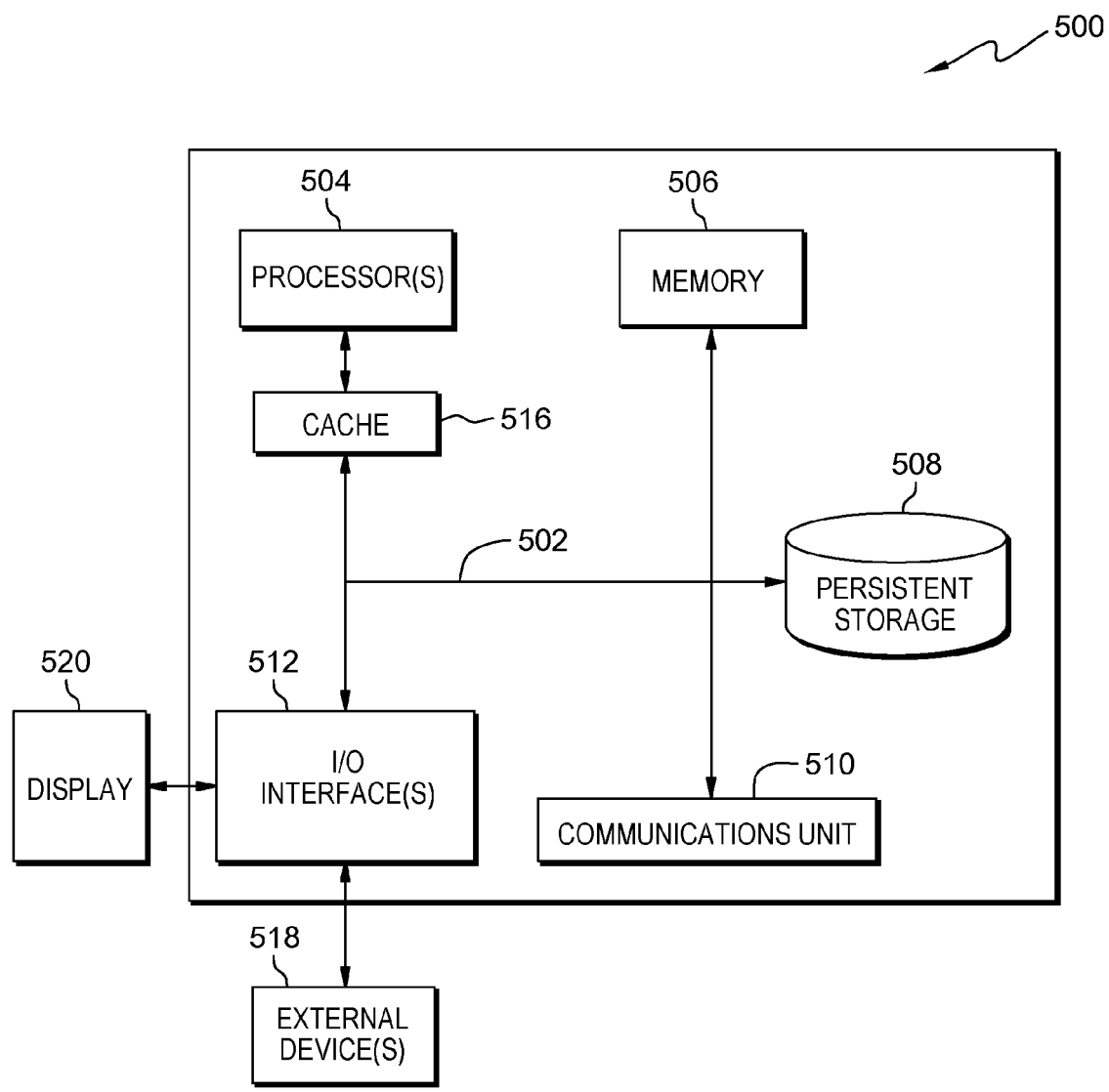
FIG. 5 sets forth a generalized architecture of computing platforms suitable for at least one embodiment of the present invention.

FIG. 5 depicts a block diagram 500 of components of computing device 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Web content manager plugin 106 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Web content manager plugin 106 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., web content manager plugin 106, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for maintaining bookmarked web content, the computer program product comprising:
    one or more computer readable storage media and program instructions stored on the one or more computer readable storage media, the program instructions comprising:
    program instructions to provide a framework for maintaining continuous access to web content via bookmarks, wherein the framework is installed as a plugin to a web browser and comprises web content storage, change notification and change detection, wherein the change notification comprises at least one of a pop-up notification window, a push notification and an alert icon in a list of bookmarks and the web content storage is a content storing subsystem to store one or more snapshots of the web content in a repository, the repository comprising at least one of local and remote storage;
    program instructions to store a first snapshot of the web content, associated with a Uniform Resource Locator (URL), in the repository responsive to detecting a bookmark for the URL, wherein the first snapshot is given a version number and is shared across one or more computing devices with one or more authorized users;
    program instructions to automatically adjust the bookmark to reflect a change to the URL, responsive to determining the change to the URL;
    program instructions to apply a cache update policy to store a second snapshot of the web content in the repository while maintaining access to previously stored snapshots, responsive to determining a change to the web content associated with the URL, wherein the cache update policy is based on at least one of receiving a content update notification, a comparison of a most recently stored snapshot with the web content and a comparison of metadata associated with the most recently stored snapshot against metadata associated with the web content;
    program instructions to relocate the web content or provide one or more content recommendations using a public search engine based on search criteria within the most recently stored snapshot responsive to determining a loss of reference to the web content, the search criteria comprising at least one of keywords and a portion of text associated with the most recently stored snapshot, and automatically adjust the bookmark to reflect the change; and
    program instructions to provide a user interface (UI) allowing a user to control one or more settings for the framework, wherein the one or more settings comprise at least one of storage of the one or more snapshots of the web content, broken link handling, the cache update policy and update notifications.

* * * * *